Oct. 1, 1968  H. L. SMITH, JR  3,403,456
IMPINGEMENT TYPE DRYING APPARATUS
Filed Feb. 14, 1967  7 Sheets-Sheet 6

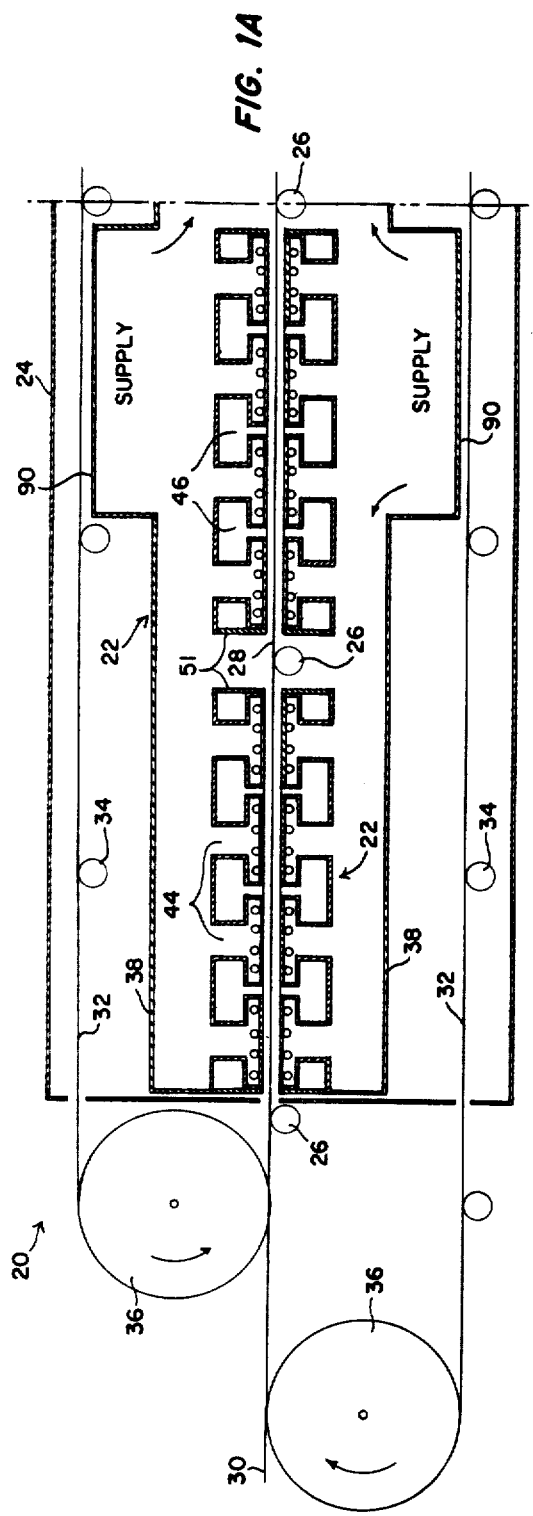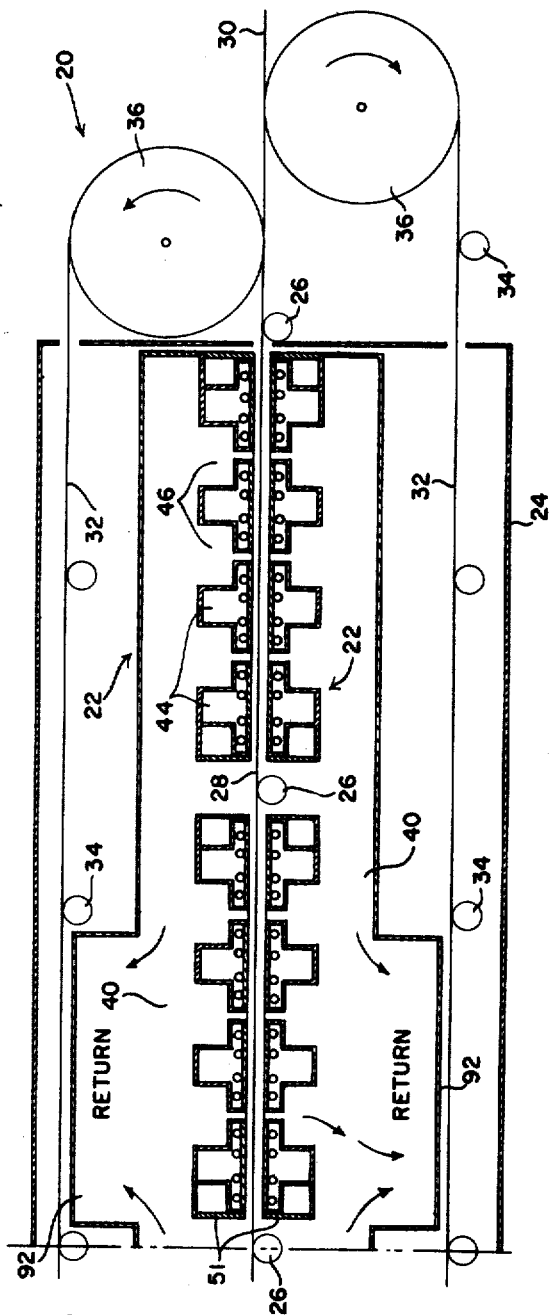

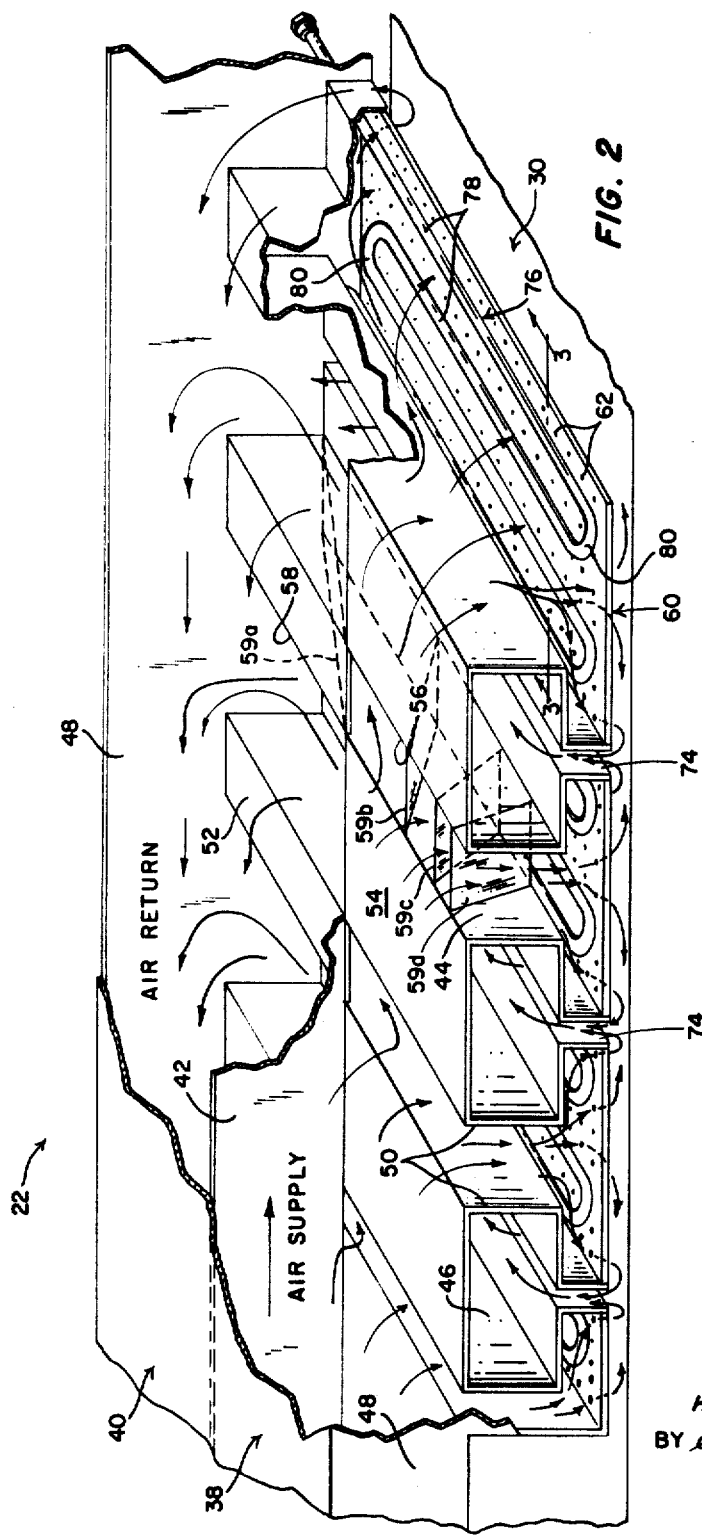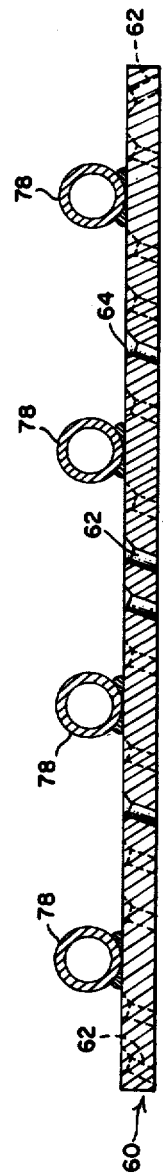

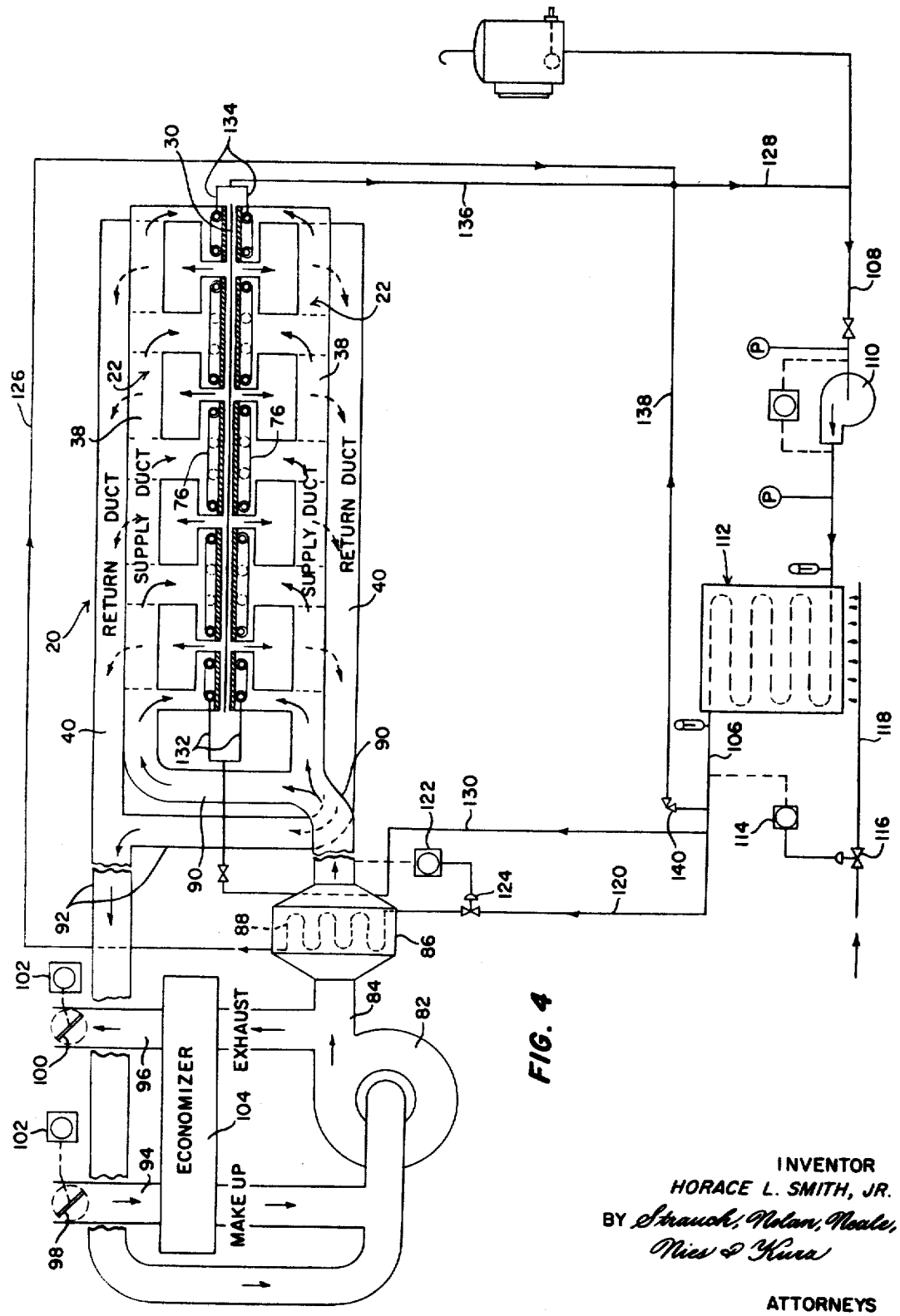

INVENTOR
HORACE L. SMITH, JR.
BY *Strauch, Nolan, Neale,*
*Nies & Kurz*

ATTORNEYS

Oct. 1, 1968   H. L. SMITH, JR   3,403,456
IMPINGEMENT TYPE DRYING APPARATUS
Filed Feb. 14, 1967   7 Sheets-Sheet 7

INVENTOR
HORACE L. SMITH, JR.
BY
ATTORNEYS

United States Patent Office

3,403,456
Patented Oct. 1, 1968

3,403,456
IMPINGEMENT TYPE DRYING APPARATUS
Horace L. Smith, Jr., Richmond, Va., assignor to White Consolidated Industries, Inc., a corporation of Delaware
Filed Feb. 14, 1967, Ser. No. 615,966
17 Claims. (Cl. 34—160)

ABSTRACT OF THE DISCLOSURE

Impingement type drying units which include supply and return ducts, flow plates for directing a fluid medium from the supply ducts into contact with the material being treated, and inlets to the return ducts for the spent fluid medium and evolved volatiles together with, if desired, an arrangement for heating the flow plates to infrared radiation emitting temperatures. Drying apparatus including such units.

BACKGROUND AND SUMMARY OF THE INVENTION

The present invention relates to drying and, more specifically, to the drying of material of sheet, web, and similar configurations. In particular, the present invention is concerned with improvements in the apparatus for drying such materials disclosed in copending application No. 537,132 filed Mar. 4, 1966.

Generally speaking, the novel drying apparatus disclosed in my earlier application includes one or more fluid supply systems, each having main supply and return ducts arranged in side-by-side fashion. A number of branch supply and return ducts extend transversely across the two main ducts, supply ducts being alternated with return ducts.

Nozzles or other flow directing members are located at spaced intervals along the branch supply ducts to direct the treating fluid from the ducts at high velocity (and preferably at an elevated temperature) into contact with the material being treated. The high velocity fluid evaporates volatiles in the material and scours the evolved volatiles away from the surface of the material to prevent the formation of the stagnant boundary layer (which would materially reduce the evolution of the volatiles). Moreover, the rapid evaporation of the volatiles produces an evaporative cooling effect, which prevents heat damage to the material being treated.

Inlets located in the branch exhaust ducts in a similarly spaced arrangement facilitate the removal of the treating fluid and its burden of evolved volatiles from the dryer or other device. The exhaust arrangement also tends to ensure that the volatiles and treating fluid are exhausted from the vicinity of the web at uniform velocity, contributing further to the uniformity of treatment.

For processes involving the application of heat to the product in which radiant heat can be advantageously employed, tubular type radiant heaters are incorporated in the fluid supply and return systems. The legs of the radiant heaters form part of the branch duct walls; and the fluid supply nozzles and exhaust inlets are fixed to or formed in branch duct wall members fixed between the heater legs.

Among the attributes of the foregoing apparatus are high efficiency, compactness, relatively low fabrication and operating costs, versatility, and the capability of producing a highly uniform product.

I have now discovered that, by making certain novel modifications in the structure disclosed in my earlier application, even higher efficiencies can be obtained. Also, by making these modifications, fabrication costs can be even further reduced and greater uniformity in the final product can be obtained.

One feature of the present invention is the substitution of apertured flow plates for the supply nozzles employed in the type of drying apparatus described above. This simplifies fabrication, thereby reducing manfacturing costs. The innovation also makes possible a more uniform and more closely regulatable distribution of the drying fluid. Therefore a more uniform product with more closely controlled physical characteristics can be obtained.

In conjunction with the foregoing, the flow plates are preferably constructed so that they constitute one side of the branch supply ducts with which they are associated. Since branch supply and return ducts are alternated in the preferred construction, at least the majority of the flow plates are accordingly located and span the distance between a pair of branch return ducts.

In this construction the rows of apertures nearest the return ducts are drilled at an angle through the flow plate so selected that they are inclined toward the inlets to the branch return ducts. This is an important practical feature of the present invention since the fluid exiting from the inclined apertures will assist in effecting a flow of spent fluid, evolved volatiles, etc. into the branch return ducts, incerasing the operating efficiency of the apparatus involved.

Except as described in the preceding paragraph, the flow plate apertures are preferably drilled at an angle such that the fluid exiting from the apertures is moving in a direction opposite to that of the material being treated. Both the inclination of the flow apertures at an angle to the material being treated and the inclination of the apertures in a direction opposite to that of material movement increase the capability of the fluid for scouring evolved volatiles away from the surface of the material being treated. Accordingly, this flow aperture arrangement also produces increased efficiency.

There is yet another advantage of inclined jets over those oriented normally to the material being dried. Specifically, the latter produce a pattern of pressure distribution in the fluid treating medium which tends to make the web or sheet being dried flutter or drift. This problem can be at least substantially eliminated by the use of properly inclined flow apertures.

A second important feature of the present invention is an improved relationship between the branch and supply ducts which materially lowers the resistance to the flow of the fluid medium from the main into the branch supply ducts and from the branch into the main return ducts. One important consequence is that, in the improved arangement, substantially uniform conditions prevail the length of the duct. This results in an even distribution of the treating fluid across the span of the material being dried and increased uniformity in the final product. Another important practical result of the decreased flow resistance is that this reduces the power required to circulate the fluid medium and, consequently, initial and operating costs.

Still another important feature of the present invention is an improved arrangement for supplying radiant energy to the material being treated. In the dryer disclosed in my earlier application, this is accomplished by incorporating a tubular radiator into the wall structure on one side of the impingement unit. I have now discovered that this relatively complex arrangement is not necessary and that the radiant energy may be satisfactorily provided by heating the flow plates across the branch supply ducts to temperatures at which they will emit radiant energy having the proper wave lengths. The necessary heat may be supplied by fixing a tubular radiator or electrical resistance or other heaters in heat transfer relationship to the inner or back sides of the flow plates.

One advantage of the improved radiant energy supplying structure just described is that it is significantly simpler and less expensive to fabricate than that disclosed in my earlier application and other arrangements heretofore proposed for generally the same purpose. Another advantage is that it provides an improved pattern of radiant energy distribution, which contributes to the production of a superior and more uniform product.

Another extremely important feature of the present invention is its superior capability for drying web and sheet type materials of many different types, especially those which are difficult to dry because of their thickness and tenacious retention of moisture, such as wood veneer, or which have a rough surface texture such as the veneers just mentioned or crepe paper, for example.

The apparatus for drying materials which are difficult to dry, especially wood veneers, most nearly related to that which I have developed is disclosed in U.S. Patent No. 3,199,213 issued Aug. 10, 1965, to F. H. Milligan et al. for Method of Changing the Moisture Content of Wood. In one aspect my novel apparatus differs from Milligan's in the use of radiant energy plus fluid impingement instead of impingement alone. I have found that the combination of radiation and fluid impingement produces significant increases in drying rates in comparison to those obtained with impingement alone. In fact the increase is appreciably greater than would be obtained if the effects of impingement and radiant heating were additive. This indicates that a combination of radiation and fluid impingement in accord with the present invention has a synergistic effect on the drying of web and sheet materials, particularly those which are difficult to dry.

In conjunction with the foregoing the increased drying rates provided by the present invention produce a decrease in the time for which the product being dried is retained in the dryer. This permits a reduction in the size of the dryer needed, resulting in a saving in initial equipment costs as well as savings in installation costs and in the costs of a structure for sheltering the drying apparatus. Accordingly, the increase in drying rates provided by the present invention is accompanied by a considerable decrease in initial costs.

Another important difference between the drying apparatus disclosed herein and that disclosed in the Milligan patent is in the impingement of the air or other treating fluid on the material being treated at an angle rather than normally as in the Milligan process. The importance of this distinction is discussed above.

A further important difference between the present invention and Milligan's is in the supply and return system for the treating fluid. As discussed above, one of the important attributes of the present invention is a construction which insures uniform impingement of the fluid medium across the span of the material being treated, since this results in a uniform end product. This is in part obtained by providing the branch return ducts with inlets which span the width of the material being treated so that the spent treating fluid can flow into the branch return ducts at any point along the ducts. In contrast, in the Milligan apparatus, the fluid medium must flow laterally from the center of the dryer to its outside edges across the material being dried as it is exhausted. This fluid increases in velocity as it traverses the dryer, which results in nonuniform treatment of the product.

From the foregoing it will be apparent that one important object of the present invention resides in the provision of novel improved apparatus for drying materials with sheet, web, and similar configurations.

Other related and important but more specific objects of the present invention are the provision of dryers in accord with the preceding object, which:

(1) Are capable of producing a uniform product of high quality.

(2) Have unusually high efficiencies.

(3) Are relatively simple and, accordingly, comparatively inexpensive to construct.

(4) Have relatively low operating costs.

(5) Are particularly adaptable to drying various diverse types of web and sheet type products, especially hard-to-dry materials such as wood veneers, crepe paper and other materials which are thick and/or have a rough or uneven surface.

Yet another important but still more specific object of the present invention includes the provision of drying apparatus and units for drying and similar apparatus which have:

(1) A novel, apertured, fluid distributing structure of simplified construction which is capable of more uniformly distributing the treating fluid and distributing it in more effective fashion and with the creation of less instability in the web or sheet of material being treated than heretofore available apparatus of the type to which the present invention relates and which is capable of reducing the power required to circulate the fluid.

(2) Which has a novel, improved, simplified arrangement for producing radiant energy for evolving volatiles from the material being treated and which is capable of distributing the emitted energy uniformly across the span of the material being treated.

Other objects, additional important features, and further advantages of the present invention will become apparent from the appended claims and as the ensuing detailed description and discussion proceeds in conjunction with the accompanying drawing.

DETAILED DESCRIPTION OF THE DRAWING

In the drawing:

FIGURES 1A and 1B together constitute a partially diagrammatic longitudinal section through a dryer embodying the principles of the present invention;

FIGURE 2 is a partial and partly broken away isometric projection of a novel fluid impingement and radiant heating unit employed in the dryer of FIGURE 1;

FIGURE 3 is a section through a flow plate incorporated in the unit of FIGURE 2;

FIGURE 4 is a diagrammatic illustration of a system for supplying fluid to and exhausting it from the impingement and radiant heating units in the dryer of FIGURE 1 and of a system for heating the fluid and the radiant heaters in the foregoing units;

DESCRIPTION OF EXEMPLARY PREFERRED EMBODIMENTS

Figure 5:
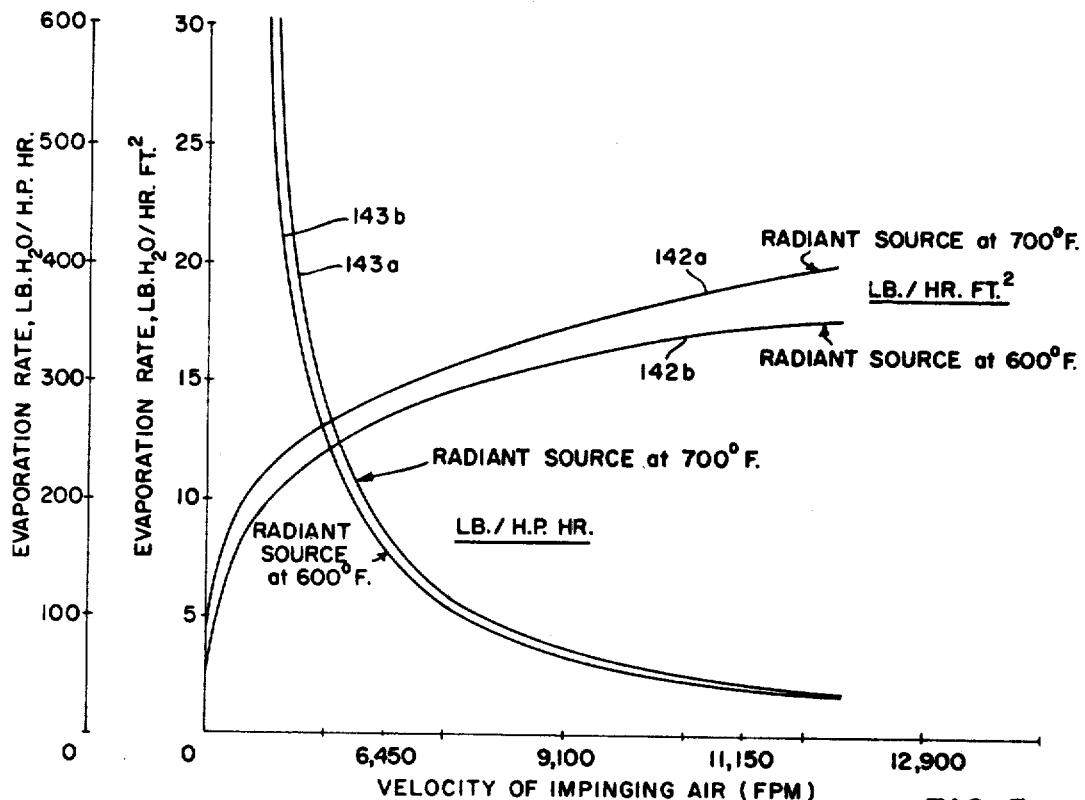
FIGURE 5 is a chart showing the relationship for an exemplary material being dried between the velocity of the fluid supplied to the drying apparatus of FIGURE 1 on one hand and the amount of water evaporated per blower horsepower hour and per square foot of radiant energy emitting surface on the other.

Referring now to the drawing, FIGURES 1A and 1B depict a novel, improved single pass dryer 20 which features fluid impingement and radiant heating units 22 constructed in accord with the principles of the present invention for drying the product to be treated. Dryer 20 also includes a casing 24, a series of parallel, spaced apart, rotatably mounted rolls 26 establishing a path 28 for the product or material being dried, which is in the form of a web 30, and endless, open mesh belts or felts 32 which confine and prevent warpage of web 30. Conventional idler rolls 34 and drive rolls 36 are also provided to support and effect movement of belts 32 Except as discussed below the dryer components are of conventional construction and will not be described further herein.

As shown in FIGURES 1A and 1B, units 22 are located between adjacent rolls 26 and on both sides of path 28 to dry web 30 by simultaneously applying radiant heat to both sides of the web to evolve volatiles from it. Units 22 also direct air or other treating fluid at high velocity into contact with the sides of the web to assist in evolving the volatiles and to scour away evolved volatiles from adjacent its surfaces. The high velocity fluid thus prevents retardation of the drying process by eliminating the formation of a stagnant layer adjacent the web and, in addition, causes evaporative cooling adjacent the surfaces of the material being treated and thereby prevents it from being overheated. It is preferred that the treating fluid also be heated, preferably to a temperature typically on the order of 250 to 700° F., since a hot, high velocity fluid such as air is a highly effective drying agent.

Referring now to FIGURE 2, each of the novel fluid impingement return and radiant heating units 22 incorporated in dryer 20 includes a main duct pair consisting of elongated main supply and return ducts 38 and 40 separated by a dividing wall 42. The main ducts 38 and 40 extend lengthwise of dryer 20.

Each of the units 22 also includes a number of generally T-sectioned branch supply and return ducts 44 and 46 extending transversely across the associated main supply and return ducts 38 and 40. The main and branch ducts are in part integral in that the side walls 48 of the main ducts form the end walls for the branch ducts.

The branch ducts are also defined by co-operating generally Z-sectioned side wall members 50 disposed in parallel, spaced apart relationship and so arranged that each side wall member is disposed in mirror image relationship to the side wall members 50 on either side of it. This results in an array of adjoining, internested ducts with branch supply and return ducts being alternated. At the ends of the units the open sides of ducts thus formed are closed by wall members 51 (see FIGURES 1A and 1B).

Branch supply and return ducts 44 and 46 also include top walls 52 and 54. As shown in FIGURE 2, the top walls 52 of the branch supply ducts span only those parts of the ducts adjacent main return duct 40, and the top walls 54 of branch return ducts 46 similarly span only those portions of the return ducts overlaid by main supply duct 38. Thus, the branch duct top walls prevent fluid from flowing between the branch supply ducts and main return duct and between the branch return ducts and main supply ducts. The elimination of the top wall members from the remaining portions of the branch ducts provides communication between the branch and main supply ducts 44 and 38 through openings 56 which are generally equal in length to the width of the main supply duct and similar openings 58 between the branch and main return ducts.

Preferably, air vanes or other air distributors are employed in branch supply ducts 44 to provide a generally uniform distribution of the treating fluid over the span of the impingement units and, accordingly, over the span of web 30. One exemplary (but by no means the only) distribution arrangement which may be employed is illustrated in FIGURE 2. This arrangement, which is capable of equalizing distribution of the treating fluid with only a relatively low pressure drop, includes a set of four vanes 59a–d in each branch supply duct (only one set of vanes is shown). Vanes 59a–d divide the flow of incoming fluid into segments which have a predetermined relation to the areas over which they are to be distributed and divert the segments of flow to the points at which the fluid is discharged against web 30. By dimensioning and positioning vanes 59a–d in accord with available techniques, a generally uniform distribution of fluid across the span of the supply duct can be provided. Equalization of fluid distribution can be obtained to any degree required, generally speaking, by increasing the number of distributor vanes.

The fluid supply arrangement just described minimizes resistance to fluid flow and produces a discharge of fluid from the branch supply ducts which is substantially uniform over the entire width of web 30 and a similar uniform flow of spent treating fluid and/or evolved volatiles from adjacent the web into the branch return ducts. This results in uniform treatment of web 30 across its entire width and, consequently, the production of a highly uniform treated product.

The minimization of flow resistance in the impingement units by the structure described above also reduces to an appreciable extent the power required to circulate the fluid treating medium through the units 22. This is of course a significant advantage in that it reduces the size of the blower required with a consequent reduction in both initial and operating costs. In fact, the fan horsepower requirements of drying apparatus in accord with the present invention are only 10–20% of those of the wood veneer dryers most widely used at the present time.

Figure 6:
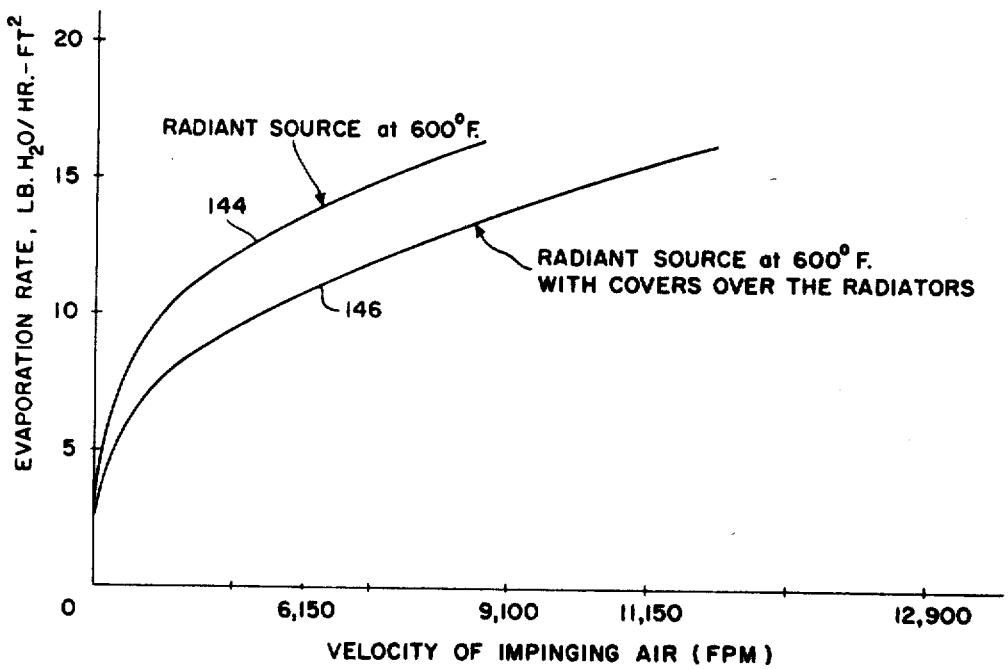
FIGURE 6 is a chart showing the contribution made by radiant energy in drying materials in accord with the present invention.
Figure 8:
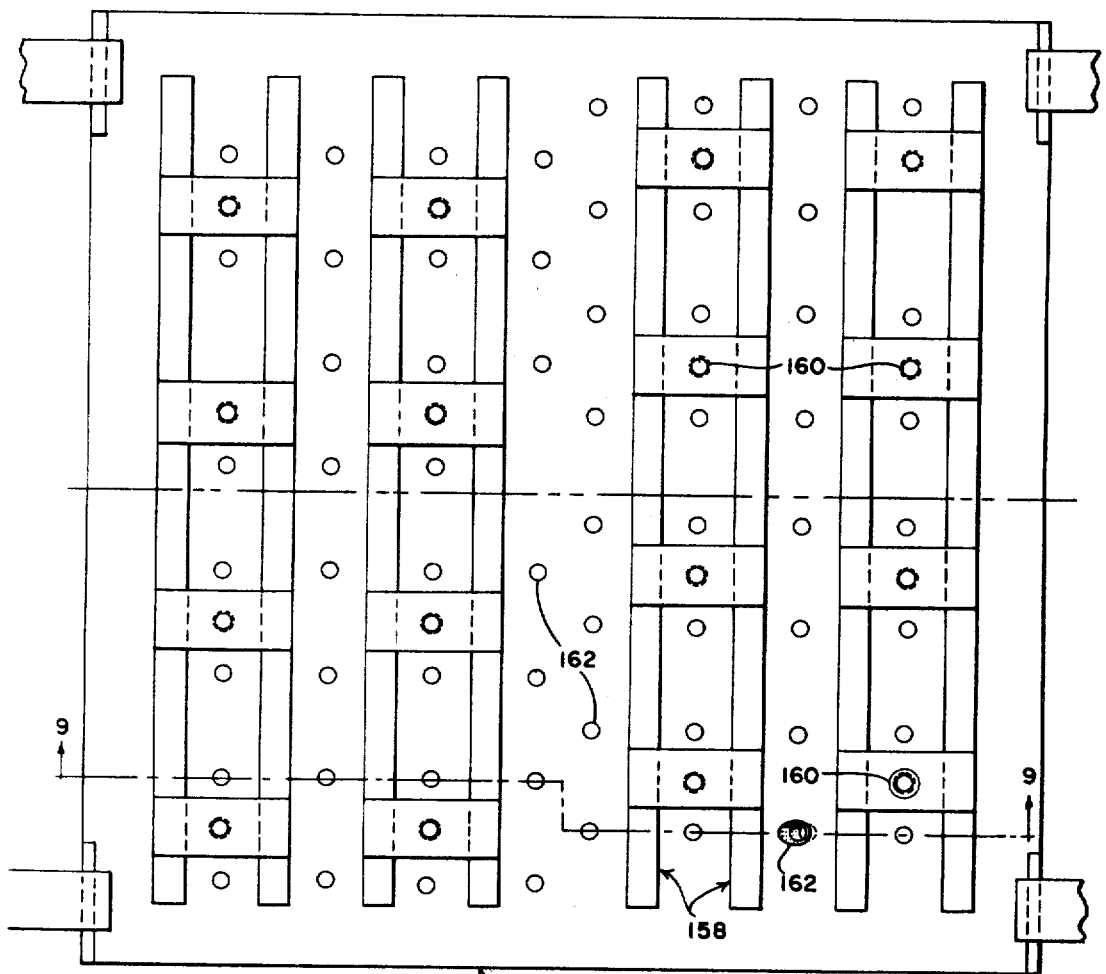
FIGURE 8 is a plan view of an embodiment of the present invention in which resistance heaters are utilized to heat the radiant energy emitting flow plates to operating temperatures.

Air or other treating fluid is accelerated and directed at high velocity (typically on the order of 2000–15,000 feet per minute) against web 30 by flow plates 60 which form the outer or exposed walls of branch supply ducts 44. Flow apertures 62 (see FIGURES 2, 3, and 6A) are drilled in a predetermined pattern through each of the flow plates 60 with the inlets 64 to apertures 62 preferably being chamfered as shown in FIGURE 3 to prevent the formation of venae contractae in the apertures.

One of the important features of the present invention resides in drilling flow apertures 62 so that the fluid exiting through them impinges upon web 30 at an angle rather than normally as in the conventional arrangement. In the latter, the normal impingement of the treating fluid on the web results in instability, drift, and flutter as the web moves at high speed past the flow plate.

By inclining the flow apertures at an angle to the web a velocity and pressure distribution pattern which will result in minimization of flutter can be produced. Also, the arrangement just described virtually eliminates areas in which the flow velocities are too low to produce the desired scouring effect. Thus there is more uniform treatment of the material in the present invention than in the conventional arrangement described above.

This arrangement is particularly important in dryers of the type shown in FIGURES 1A and 1B in which impingement units are located on both sides of the web since, in this type of arrangement, the instability caused by one flow plate is apt to reinforce that caused by the other, materially aggravating flutter and drift and lack of stability in the web.

Also, as shown in FIGURE 3, the majority of the flow apertures 62 in flow plate 60 are so oriented that the treating fluid discharged from them impinges upon web 30 in a direction opposite to the direction of movement of the web. As a result, the velocity of the web and the velocity component of the treating fluid in a direction parallel to the web are additive. Thus, for a given velocity of fluid flow through apertures 62, a greater effective velocity can be obtained by the preferred orientation than by using the conventional arrangement.

Also, the flow arrangement just described produces greater turbulence than would be obtained if the treating fluid impinged on the web at right angles to the direction of movement of the web. The net result of the foregoing factors is that treating fluid impinging on the web in the manner just discussed has a significally greater scouring action than could be obtained if the fluid impinged upon the web at right angles or in the direction of web movement.

Referring again to FIGURE 2, the spent treating fluid, together with its burden of evolved volatiles, flows into branch return ducts 46 through inlet apertures 74. These extend the length of the branch return ducts and accordingly minimize the resistance to the flow of the treating fluid and evolved volatiles into the return ducts. Moreover, since the exhaust openings span the material there is virtually no lateral flow of the spent fluid and evolved volatiles. This is important since, as indicated above, lateral flow of the fluid and volatiles can produce variations in drying conditions across the sheet and, accordingly, a nonuniform product.

Referring now to FIGURE 2, each of the flow plates 60 (except for those on the ends of impingement units 22) is located between the inlets 74 to two successive branch ducts; and the rows of flow apertures 62 adjacent each of the branch duct inlets are so oriented that the treating fluid discharged from them is inclined toward the branch duct inlets. This is another important feature of the present invention since the fluid discharging toward the inlet ducts tends to force the spent fluid and evolved volatiles adjacent web 30 through inlets 74 into branch return ducts 46. As shown in FIGURE 3, these nozzles are preferably inclined at a somewhat greater angle to the surfaces of the flow plate than the remaining apertures to increase the effect just discussed.

While a uniform distribution of the treating fluid across the span of web 30 is normally provided by uniformly spacing flow apertures 62 the length of flow plate 60, controlled nonuniform distribution of the treating fluid can be provided by an appropriate nonuniform spacing of the flow apertures, where desired.

The flow apertures will typically be drilled through the flow plate at an angle of 15°. The total area of the openings will normally be from 1.25 to 4% of the total area of the plate and may even be a lower percentage of the total plate area.

It will be apparent, from the foregoing, that volatiles may be evolved from web 30 merely by effecting a flow of air or other treating fluid at high velocity and high temperatures through flow plate 60 into contact with the material being dried. However, in the preferred embodiment of the present invention, volatiles are evolved much more rapidly, thereby materially increasing the efficiency of units 22, by heating flow plate 60 to temperatures above that of the treating fluid so that emission of radiant energy in the infrared portion of the electromagnetic spectrum from the plates will be enhanced. Thus, the material being treated will also be dried by radiant energy as well as impinging fluid.

In the fluid impingement and radiant heating unit 22 illustrated in FIGURE 2, this is readily and simply accomplished by welding or otherwise fixing tubular type heaters 76 in heat conductive relationship to the inner or back sides of the flow plates as shown in FIGURE 3. Each heater 76 consists of a plurality of parallel, spaced apart, straight legs 78 extending longitudinally of the associated flow plate 60. The legs 78 are connected by end bends 80 alternately located at opposite ends of the associated flow plate.

If they are to be employed as sources of radiant energy, the flow plates will preferably be fabricated of a material which is a good thermal conductor and has a relatively high coefficient of emission yet can be drilled and welded without undue difficulty. One satisfactory material is sheet steel.

To increase the absorptivity of heat from tubular heaters 76 and the emissivity of the flow plates, the surfaces of the latter may be covered with a high emissivity coating. A number of satisfactory coatings are described in my Patent No. 3,262,494 issued July 26, 1966, for Heat Exchangers.

Referring next to FIGURES 1A, 1B, 2, and 4, the treating fluid is supplied to the main supply duct 38 in each unit 22 by a blower 82 connected through a duct 84 to a fluid heater 86. As it flows through the fluid heater, the treating fluid is heated by a heat exchanger 88. From heater 86, the fluid flows through supply trunks 90 into the main supply ducts 38 of units 22 and then into branch supply ducts 44. Similarly, the spent treating fluid and its burden of evolved volatiles flows from the branch return ducts 46 of the various units 22 through ports 58 into the associated main return ducts 40, which are displaced from their normal position adjacent supply ducts 38 in FIGURE 4 for explanatory purposes. From these ducts, the spent fluid and its burden flows into a schematically illustrated return trunk identified by reference character 92 in FIGURE 4.

In the present invention, return trunk 92 is preferably connected to the inlet of circulating blower 82 so that the spent treating fluid may be recirculated through the system. This eliminates the loss of sensible heat which would result if the spent fluid were discharged from the system.

In many applications of the present invention, such as in the drying of paper or other cellulosic products, for example, the percentage of moisture or other volatiles in the treating fluid must be closely controlled to produce the desired characteristics in the treated product. To permit such control, return trunk 92 is provided with a make-up duct 94; and a vent duct 96 branches from the duct 84 between blower 82 and fluid heater 86. Valves 98 and 100 control the flow through make-up and vent ducts 94 and 96, respectively. By adjusting valves 98 and 100, recirculated fluid can be discharged from the system and replaced with fluid having a lower content of volatiles to maintain the volatile content at the desired level. Valves 98 and 100 may be adjusted manually or, if desired, may be automatically adjusted by diagramatically illustrated controllers 102 of any suitable type or by a system of the type described in my Patent No. 3,208,158 issued Sept. 28, 1965, for Dryers.

An economizer 104 of conventional construction may be connected between the vent and make-up ducts to extract sensible heat from the vented fluid and add it to the make-up fluid, if desired. This recovers otherwise wasted heat, increasing the efficiency of the drying system.

Referring still to FIGURE 4, the heat exchanger 88 in fluid heating unit 86 and heaters 76 are all of the type through which a heated fluid heat transfer medium is circulated to elevate them to the desired temperature. The preferred heat transfer mediums are high boiling point organic liquids and eutectic mixtures of inorganic salts, which can be circulated at extremely high temperature in liquid form. Suitable media of this type are discussed in detail in Patent No. 3,262,494.

The advantage of employing liquid heat transfer media is that the radiant treating fluid may be heated to temperatures of several hundred degrees Fahrenheit without the problems appurtenant to the extreme pressures associated with high temperature steam.

The system illustrated in FIGURE 4 for heating and circulating the liquid heat transfer medium includes a storage tank (not shown) from which the liquid can be pumped to the main circulation system. This includes main supply and return conduits 106 and 108 and is a closed loop through which the liquid is circulated by a pump 110.

From main return conduit 108 the heat transfer liquid flows into a liquid heating unit 112 where it is heated to the desired temperature. This unit may be of any desired construction and preferably includes a temperature responsive controller 114 which so regulates the flow of fuel to the heating unit through valve 116 and conduit 118 as to maintain the temperature of the heated liquid flowing into main supply conduit 106 substantially constant.

From main supply conduit 106, part of the heated liquid flows through branch supply conduit 120 to the heat exchanger 88 in fluid heater 86. The volume of flow through conduit 120 is controlled by temperature responsive controller 122, which is connected to a valve 124 in conduit 120 and has a sensor (not shown) in supply trunk 90. Controller 122 regulates valve 124 so as to maintain the temperature of the treating fluid flowing into the supply trunk substantially constant. From fluid heating unit 86, the heat transfer liquid flows through return conduits 126 and 128 back into main return conduit 108.

The remainder of the heat transfer liquid flowing through main supply conduit 106 is diverted through supply conduits 130 and 132 to the heaters 76 in fluid impingement and radiant heating units 22 of dryer 20. From heaters 76 of the heat transfer liquid flows through conduits 134 and 136 and the aforementioned return conduits 128 and 108 back to heating unit 112.

The heat transfer liquid circulation system also includes a bypass conduit 138 connected between supply conduit 106 and return conduit 128. A pressure relief valve 140 in bypass conduit 138 insures continued flow under abnormal conditions such as conduit blockage and therefore prevents such abnormal conditions from causing damage to the system.

Further details and the advantages of the foregoing heating and circulating system are described in U.S. Patent No. 3,236,292 issued Feb. 22, 1966, for Dryers and copending application No. 537,132 filed Mar. 24, 1966, for Apparatus and System, which are incorporated herein by reference.

As mentioned briefly above, the dryers of the present invention represent an advance in the art in that they are capable of efficiently drying materials which have heretofore been recognized as difficult to dry. Among these are wood veneers which can be dried only with difficulty because of their thickness and because of the tenaciousness with which moisture is retained in the wood fibers. However, even wood veneers can be readily and uniformly dried by the combination of radiant heat and high velocity impinging air provided by the dryers of the present invention. For example, pine veneers as thick as 3/16" have been successfully dried in accord with the present invention in approximately 6¼ minutes. In contrast, in present commercially used dryers, as much as 25–30 minutes may be required to satisfactorily dry 3/16" veneers.

The foregoing is not to be taken as meaning that no benefits are realized by employing the principles of the present invention in the drying of materials which are more readily handled by conventional techniques. On the contrary, the following exemplary tabulations shows that significant increases in drying rates and corresponding decreases in retention time can also be obtained in employing the principles of the present invention to dry materials which, in comparison to wood veneers, are less difficult to dry.

*Drying rates for kraft carton linerboard*

Industry average:[1]
    Water evaporated=2.3 lb./hr./sq. ft. of dryer surface
Best reported performance:[1]
    Water evaporated=3.8 lb./hr./sq. ft. of dryer surface
Present invention:
    Water evaporated=13.2 lb./hr./sq. ft. of dryer surface

*Drying rates for pulp, unbleached kraft*

Industry average:[2]
    Water evaporated=1.2 lb./hr./sq. ft. of dryer surface
Best reported performance:[2]
    Water evaporated=2.1 lb./hr./sq. ft. of dryer surface
Present invention:
    Water evaporated=8 lb./hr./sq. ft. of dryer surface For drying wood veneers and similar materials radiator temperatures of 300–700° F. are preferably employed to provide radiant energy peaking in the range of about 6.9 to 4.5 microns. The impinging air will typically be heated to temperatures of 400–700° F.

For other materials different radiator and air temperatures may prove more satisfactory. Also, the final moisture to which the product is to be dried will influence the temperature of the air. For example, if cellulosic materials such as cotton liners are to be dried to moisture contents such as 5%, which is very low, air temperatures may have to be reduced to as low as 345° F. to prevent heat damage to the product. On the other hand, for a residual moisture content of 25%, air heated to temperatures as high as 525° F. may be used without danger of overheating. The most appropriate air temperature in a given set of circumstances can be readily ascertained by test drying samples of the material involved. In any event radiator temperatures will normally be in the range of 400–700° F. or higher, and air temperatures will normally be in the range of 250–700° F.

Air having a low moisture content (less than 0.4 pound of water pound of dry air) or "dry" air is preferably employed in the practice of the present invention. Contrary to what might be expected from the numerous statements in the literature regarding the increase in drying capacity and thermal efficiency that can be obtained by increasing the moisture content of air, it has been found that increases in drying rates are not obtained by increasing the moisture content of the drying air in the practice of the present invention.

Furthermore, it has been found that air having a high moisture content will damage the product being dried even while the product still has a high moisture content. In fact, in one actual test in which the air had a relatively high moisture content but a moderate 400° F. temperature, heat damage occurred at a point where the moisture content of the sample was still 200% by weight of the dry weight of the sample. In contrast, material can be dried to moisture contents as low as 5%–10% without damage in dryers embodying the present invention if dry or relatively dry air and the moderate temperature mentioned above are utilized.

Typically, the impingement velocity of the drying air employed in accord with the present invention will be on the order of 2,000–15,000 feet per minute as mentioned above. Even higher velocities may be beneficially employed in certain applications, however, to increase the scouring and evaporative cooling effect. The only significant limitations on this velocity are the ability of the material being treated to withstand the impact of the fluid and the expense of providing and operating equipment capable of delivering fluid at extremely high velocities.

In conjunction with the foregoing, curves 142a and 142b of FIGURE 5 illustrate that drying rates do increase significantly with increases in impingement veloc- ---
[1] The source of these figures is TAPPI Data Sheet 155D.
[2] The source of these figures is TAPPI Data Sheet 155A.

ities. However, curves 143a and 143b of the same figure show that the increase in impingement velocity is also accompanied by a marked decrease in the pounds of water evaporated per horsepower hour required to circulate the high velocity air as impingement velocities reach light levels. This of course means that, as the air velocity is increased, there is a corresponding increase in operating costs. For any given application, therefore, a compromise must be made between drying rates and the cost of drying the product involved.

The test conditions for producing the results charted in FIGURE 5 were as follows.

| | |
|---|---|
| Material dried | 1/8" thick green pine veneer. |
| Radiant energy source | 600° F. (4.9μ), 700° F. (4.5μ). |
| Air temperature | 450° F. |
| Specific humidity of air | 0.4 pound of water per pound of dry air. |
| Air velocity | 0→10,000+ f.p.m. |
| Drying time | 1½–3 minutes. |
| Initial moisture content | 110% by weight of the dry wood. |
| Final moisture content | 5% by weight of the dry wood. |

As mentioned previously, the drying rates produced by the combination of radiant heat and high velocity drying air are substantially higher than those obtainable by using high velocity air alone. To demonstrate this a cellulosic material was dried with a combination of dry air at a temperature of 450° F. and radiant energy from a source at a temperature of 600° F. The test results are shown by curve 144 in FIGURE 6.

The test was then repeated under the same conditions except with the radiation emitting flow plates covered to substantially block the transmission of radiant heat from them to the material being dried. The results of the second series of tests are shown by curve 146 in FIGURE 6.

A comparison of the two curves shows the substantial contribution made by radiant energy when employing it in combination with high velocity air in accord with the present invention.

Figure 7:
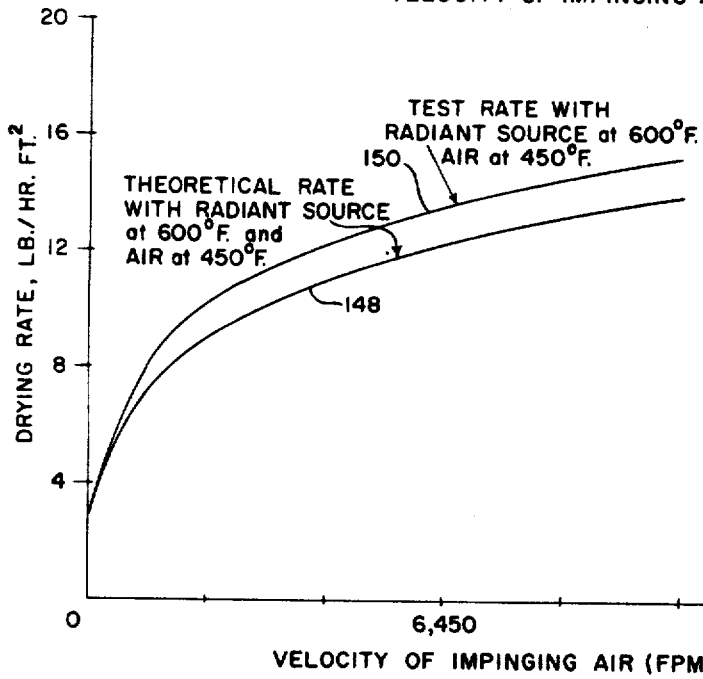
FIGURE 7 is a chart showing the synergistic effect of combined impinging fluid and radiant energy on drying rates.

In conjunction with the foregoing, the drying rates produced by the combination of radiant heat and high velocity impingement air preferably utilized in the dryers of the present invention are, surprisingly, significantly greater than would be expected from adding the theoretical drying rates of radiant heat alone and high velocity air alone. This is apparent from FIGURE 7 in which curve 148 shows the calculated drying rates for a 600° F. radiant source and 450° F. air over a velocity range of 0 to approximately 8000 f.p.m. This was computed by measuring the drying rate with both the air and the radiant source at a temperature of 450° F. and then adding the increment of radiation derived from subtracting the radiation corresponding to a 450° F. temperature from that associated with a 600° F. temperature. Curve 150 shows the results actually obtained. Over substantially the entire velocity range the actual drying rates are considerably higher than the calculated rates.

For example, at an impingement velocity of approximately 4000 f.p.m., the actual drying rate is about 9% greater than the theoretical rate predicted by adding the calculated drying effects of the radiant energy and the impingement air. Accordingly, the combined use of radiant heat and fluid impingement in accord with the present invention is highly advantageous, especially where maximum rates are desired or the product is difficult to dry.

Many modifications may of course be made in the exemplary embodiment of the invention described above without exceeding its scope.

Probably the most important of these is the drying of the material being treated from one side rather than both sides as in the embodiment of FIGURES 1A and 1B. Unexpectedly, it has been found that drying rates obtained by drying from one side are up to 70% as high as those attained by drying material from both sides. Accordingly, it may in many if not most applications be more economical to dry materials from one side only.

Furthermore, the foregoing modification permits significant reductions to be made in the complexity of the drying apparatus, considerably reducing the capital investment required for a plant of given capacity.

In a typical modification of this type the dryer will be identical to the dryer illustrated in FIGURES 1A and 1B except that the lower impingement units 22 will be eliminated. Rollers such as those illustrated at 26 in FIGURES 1A and 1B will be employed to support the web as it moves beneath the units located above the path of the web.

Many variations of the foregoing arrangement are of course possible. For example, the impingement units can be located to one side of a vertical or inclined path or below a horizontal path.

As a further example of modifications which may be made in the exemplary apparatus illustrated in FIGURES 1A, 1B, and 2, branch ducts and accompanying flow plates may be employed on both sides of the main duct pairs. This will enable the impingement unit to supply air to passes or zones on both sides of the unit adapting it for use in multiple run installations.

Figure 10A:
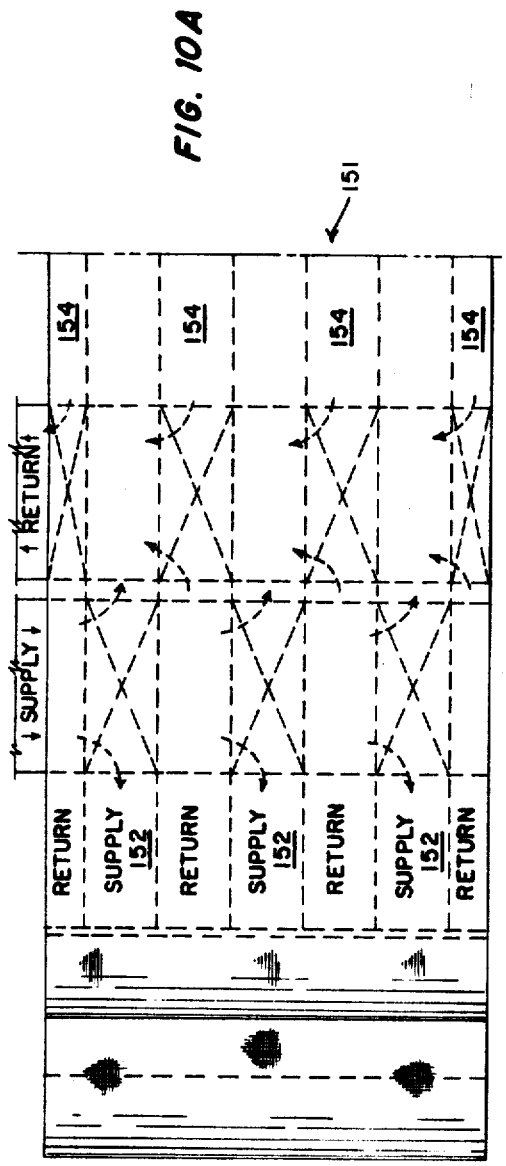
FIGURES 10A and 10B together constitute a generally diagrammatic plan view of drying apparatus in accord with the present invention which has a modified arrangement of fluid supply and return ducts.
Figure 10B:
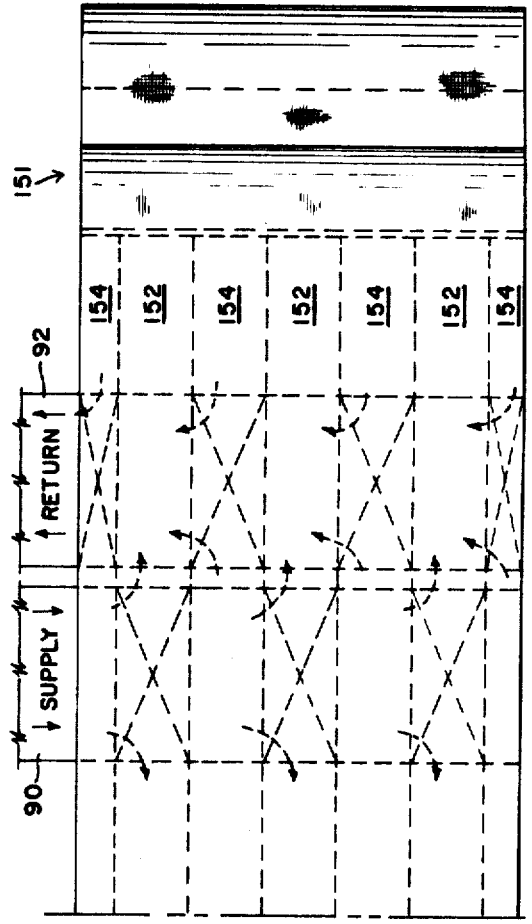

Another examplary modification which may be made in the embodiment of the invention described in detail above is the use of plural as opposed to single pairs of main supply and return ducts in the radiant heating and fluid units. Drying apparatus embodying this modification is identified by reference character 151 in FIGURES 10A and 10B of the drawing. This arrangement may be advantageous in applications of the present invention where the product being treated is quite wide and in which the transversely extending branch supply and return ducts must accordingly be relatively long.

In drying apparatus 151 each branch supply duct is supplied with heated air from three parallel main supply ducts 152 disposed at intervals across the branch ducts, and the spent fluid together with its burden of evolved volatiles can flow from the branch return ducts into any one of four main return ducts 154 alternated with the main supply ducts. The plural connections between the main and branch ducts maintain the flow and pressure conditions in the branch ducts more uniform than would be obtained in a dryer with very long branch ducts and only one point of communication with the main ducts. In the latter case, depending upon the length of the branch ducts, there may be considerable variations in pressure and other flow parameters along the length of the branch ducts. The importance of maintaining uniform flow is that, as discussed above, this results in a more uniform product.

Figure 9:
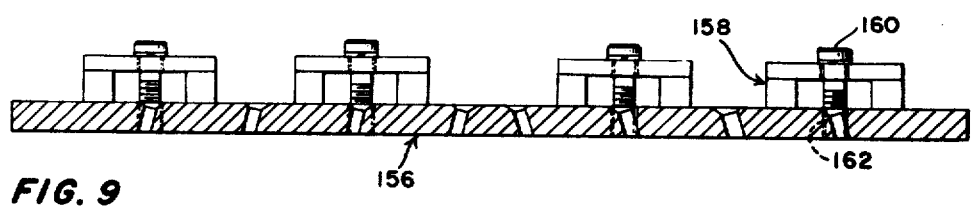
FIGURE 9 is a section through the structure shown in FIGURE 8 taken substantially along line 9—9 of the latter figure.

Another modification which may be made in the first described embodiment of the present invention is the use of a different type of heater to elevate the temperature of the flow plates to the point at which they will emit radiant energy of the desired wave lengths. FIGURES 9 and 10, for example, illustrate a flow plate 156 in which conventional electrical strip heaters 158 such as the square type manufactured by Hotwatt, Inc. are fixed to the back side of the flow plate as by screws 160, which extend into drilled and tapped apertures 162 in the flow plates. The number, spacing, and capacity of heaters 158 may of course be varied as appropriate for particular applications of the present invention.

The modifications of the present invention just discussed are merely exemplary; and, accordingly, the description of these embodiments is not to be taken as restricting the scope of the present invention, which is intended to be limited only as expressly stated in the appended claims.

The invention may be embodied in other specific forms without departing from the spirit or essential characteristics thereof. The present embodiments are therefore to be considered in all respects as illustrative and not restrictive,

What is claimed and desired to be secured by Letters Patent is:

1. A fluid impingement and radiant heating unit comprising a plurality of elongated supply ducts; return ducts cooperating with said supply ducts; means for distributing a fluid medium from said supply ducts to an area thereadjacent; means providing inlets to said return ducts; and means for heating said fluid medium distributing means to a temperature at which said last-mentioned means will emit radiation in the infrared portion of the spectrum.

2. A fluid impingement and radiant heating unit comprising a plurality of elongated supply ducts disposed in parallel, spaced apart relationship; means co-operating with said supply ducts to define return ducts therebetween; means for distributing a fluid medium from said supply ducts to an area thereadjacent; means providing inlets to said return ducts; and means for heating said fluid medium distributing means to a temperature at which said last-mentioned means will emit radiation in the infrared portion of the spectrum.

3. The unit of claim 1, wherein the fluid medium distributing means comprises apertured flow plates on one side of said unit, said flow plates constituting one wall of each of the supply ducts and wherein the means for heating the fluid medium distributing means comprises heater means disposed in the supply ducts in heat transfer relationship to said flow plates.

4. The unit of claim 3, wherein said heating means is of tubular construction and is adapted to have a heat transfer fluid circulated therethrough.

5. The unit of claim 3, wherein said heating means is of the electrical, resistance type.

6. A radiant heating and fluid impingement unit comprising a series of elongated, adjacent branch supply and return ducts, supply ducts being alternated with return ducts; flow plates extending across one side and the length of each of said branch supply ducts, there being apertures through said flow plates by way of which a fluid medium can flow from said branch supply ducts to an area adjacent said flow plates and on the side thereof opposite said supply ducts; inlets to said branch return ducts extending substantially the length of said branch return ducts for fluid flow from the area to which it is supplied into said branch supply ducts; means for supplying the fluid to and exhausting it from said branch supply and branch return ducts, respectively; and means for heating said flow plates to a temperature at which said plates will emit radiant energy in the infrared portion of the spectrum into the area to which the fluid medium is supplied.

7. A radiant heating and fluid impingement unit comprising a series of elongated branch supply and return ducts; flow plates extending across one side of each of said branch supply ducts, there being apertures through said flow plates by way of which a fluid medium can flow from said branch supply ducts to an area adjacent said flow plates and on the side thereof opposite said supply ducts; inlets to said branch return ducts for fluid flow from the area to which it is supplied into said branch return ducts; means for supplying the fluid to and exhausting it from said branch supply and branch return ducts, respectively; and means for heating said flow plates to a temperature at which said plates will emit radiant energy in the infrared portion of the spectrum into the area to which the fluid medium is supplied.

8. The unit of claim 7, wherein said apertures are arranged in rows extending across the flow plates and wherein the apertures in the rows adjacent the inlets to the branch return ducts are inclined toward said inlets, whereby the fluid medium exiting through said apertures promotes the flow of spent fluid medium and evolved volatiles through said inlets into the branch return ducts.

9. The unit of claim 7, wherein the inlet ends of said apertures are chamfered to promote the flow of the fluid medium therethrough.

10. Apparatus for treating web and sheet material and the like comprising means establishing a path for the material to be treated; means for moving the material to be treated along said path; and at least one fluid impingement unit located adjacent said path, said unit including a series of elongated supply and return ducts extending transversely of said path, a flow plate closing the side of each supply duct adjacent the path for the material being treated, flow apertures through each of said plates for directing a fluid medium from said supply ducts into contact with said material and inlets to said branch return ducts for said fluid medium and volatiles evolved from said material, said flow apertures being arranged in rows extending transversely of said path with the apertures in the outer row thereof being inclined with respect to said path and toward the nearest branch duct inlet to provoke the flow of the fluid medium and evolved volatiles through said inlets into said branch return ducts and said apertures otherwise being inclined with respect to the flow path and in a direction opposite to the direction of the movement of the material being treated to increase the capacity of the fluid medium for scouring evolved volatiles from adjacent the path of the material being treated.

11. The apparatus of claim 10, together with duct means connected between said supply and return ducts; means for circulating the fluid medium through said duct means; a vent duct connected to said duct means; a make-up duct connected to said duct means; and selectively adjustable valves in said vent and make-up ducts for adjusting the amount of fluid medium respectively discharged and admitted through the vent and make-up ducts, respectively.

12. The apparatus of claim 11, together with economizer means operatively connected to said vent and make-up ducts for transferring heat from fluid exiting from said vent duct to fluid entering through the make-up duct.

13. Apparatus for treating web and sheet material and the like comprising means establishing a path for the material to be treated; means for moving the material being treated along said path; and at least one radiant heating and fluid impingement unit located adjacent said path, said unit including cooperating supply and return ducts; means for directing a fluid medium from the supply ducts into contact with said material; means providing inlets to said return ducts for said fluid medium and volatiles evolved from the material being treated; means for supplying the fluid medium to and exhausting it from the supply and return ducts, respectively; and means for heating the fluid medium distributing means to a temperature at which said means will emit radiation in the infrared portion of the spectrum.

14. Apparatus for treating web and sheet material and the like comprising means establishing a path for the material to be treated; means for moving the material being treated along said path; and at least one radiant heating and fluid impingement unit located adjacent said path, said unit including supply and return ducts disposed in side-by-side relationship and extending transversely across said path, means for directing a fluid medium from the supply ducts in a direction generally opposite to that in which the material being treated is moving and into contact with said material, means providing inlets to said return ducts for said fluid medium and volatiles evolved from the material being treated, means for supplying the fluid medium to and exhausting it from the supply and return ducts, respectively; and means for heating the fluid medium distributing means to a temperature at which said means will emit radiation in the infrared portion of the spectrum.

15. The apparatus of claim 13, wherein said heating means comprises a radiator adapted to have a heat transfer fluid circulated therethrough and including means for heating the fluid discharged into said supply duct including a heat exchanger adapted to have the heat transfer fluid circulated therethrough and means for independently regulating the flow of the heat transfer fluid through said radiator and said heat exchanger.

16. Combination radiation and convection type drying apparatus for treating web and sheet material and the like comprising means establishing a path for the material to be treated; means for moving the material along said path; and at least one radiant heating and fluid impingement unit located adjacent said path, said unit comprising means for directing radiant energy against said material as it moves through the drying apparatus to evolve volatiles therefrom and fluid distributing means for accelerating and directing a gaseous fluid against said material to scour evolved volatiles away from the surface of the material against which the radiant energy is directed, said fluid distributing means being so related to the source of the radiant energy that the part of the web against which the gaseous fluid is directed is generally coterminous with the part of the web against which the radiant energy is directed and the means for directing radiant energy against said material comprising means for heating said fluid medium distributing means to a temperature at which said last-mentioned means will emit radiation in the infrared portion of the spectrum.

17. An impingement unit for drying apparatus and the like, comprising an array of elongated branch supply ducts disposed in spaced apart relationship and cooperating branch return ducts between said supply ducts, said branch supply and return ducts being defined by elongated wall members generally equal in length to said ducts with each wall member bounding a branch supply duct and a branch return duct adjacent the branch supply duct defined by said member; means on one side of the array of branch ducts providing outlets from said branch supply ducts and inlets to said branch return ducts, respectively, said last-named means including apertured flow plates constituting one side of the branch ducts with which they are associated, said flow plates being substantially wider than the inlets to the branch return ducts and said branch supply and return ducts having T-shaped cross-sections with supply and return ducts alternated and alternate ducts inverted to accommodate the discrepancy in width between said flow plates and the inlets to said return ducts, whereby the branch duct array is comprised of a series of internested, T-sectioned, branch supply and return ducts; and means for supplying a fluid medium to and exhausting it from said branch supply and return ducts, respectively, including main supply and return ducts extending on the opposite side of the array of branch supply and return ducts from said outlets and inlets and spanning a plurality of said branch supply and return ducts and openings between each of said branch supply ducts and the main duct associated therewith and between each of the branch return ducts and the main duct associated therewith.

References Cited
UNITED STATES PATENTS

| | | | |
|---|---|---|---|
| 2,022,593 | 11/1935 | Fuykers | 34—160 XR |
| 2,038,457 | 4/1936 | Venturini | 34—155 |
| 2,229,285 | 1/1941 | Gehnrich | 34—160 XR |
| 2,264,329 | 12/1941 | Offen | 34—160 |
| 2,391,764 | 12/1945 | Andrews | 34—4 XR |
| 2,896,335 | 7/1959 | Dungler | 34—160 XR |
| 3,012,335 | 12/1961 | Allander et al. | 34—160 XR |
| 3,077,675 | 2/1963 | Dickens | 34—160 XR |
| 3,098,725 | 7/1963 | Stuchbery et al. | 34—122 XR |
| 3,254,426 | 6/1966 | Lamb et al. | 34—160 XR |

FOREIGN PATENTS 261,636    9/1949    Switzerland.

FREDERICK L. MATTESON, Jr., *Primary Examiner.*

A. D. HERRMANN, *Assistant Examiner.*